Figure 1:
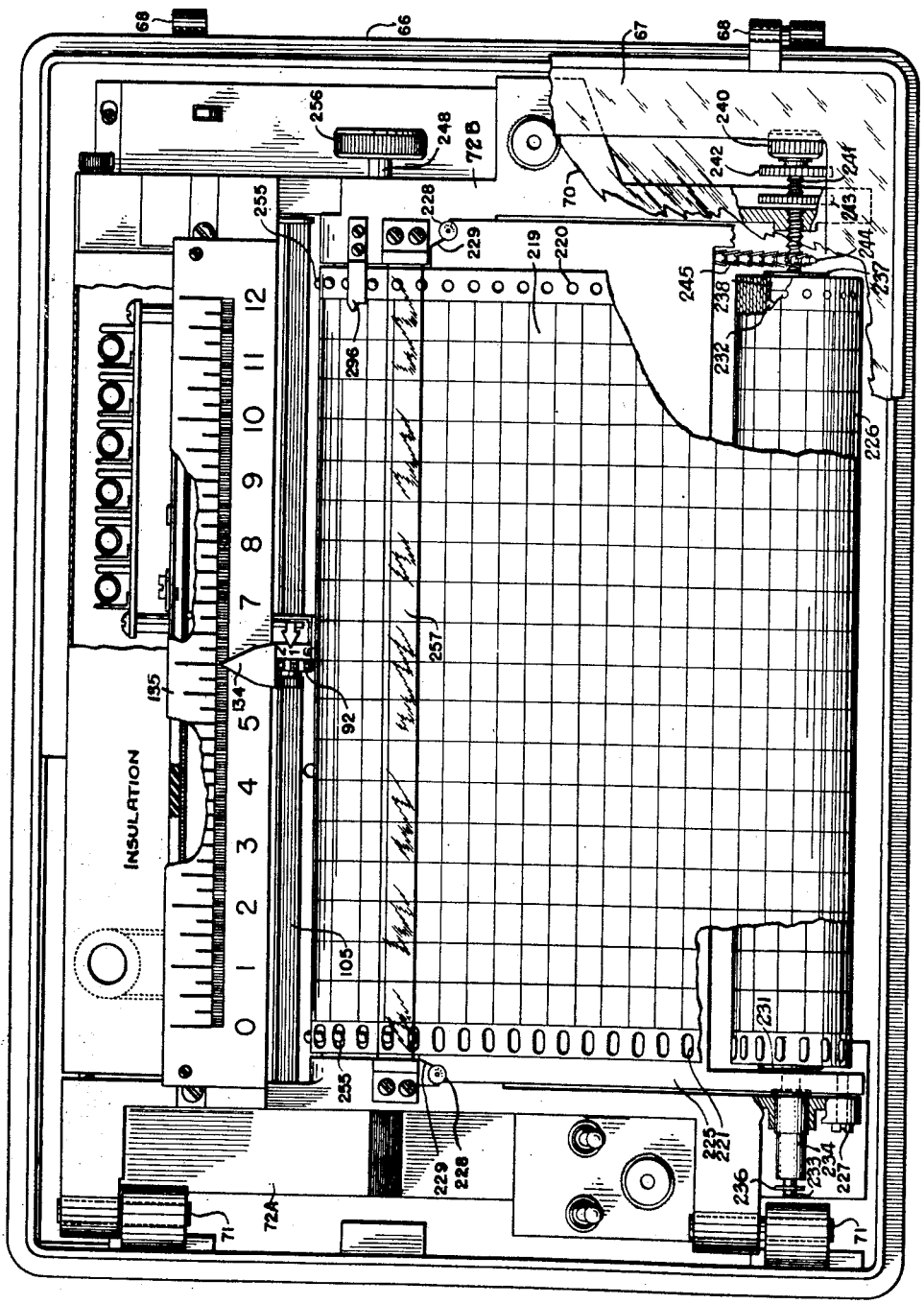

Nov. 18, 1952        J. A. CALDWELL        2,618,528

CHART DRIVE MECHANISM

Original Filed June 20, 1942        3 Sheets—Sheet 1

INVENTOR.
JOHN A. CALDWELL
BY *E. Wallford Mason*
ATTORNEY

Nov. 18, 1952     J. A. CALDWELL     2,618,528
CHART DRIVE MECHANISM
Original Filed June 20, 1942     3 Sheets—Sheet 2
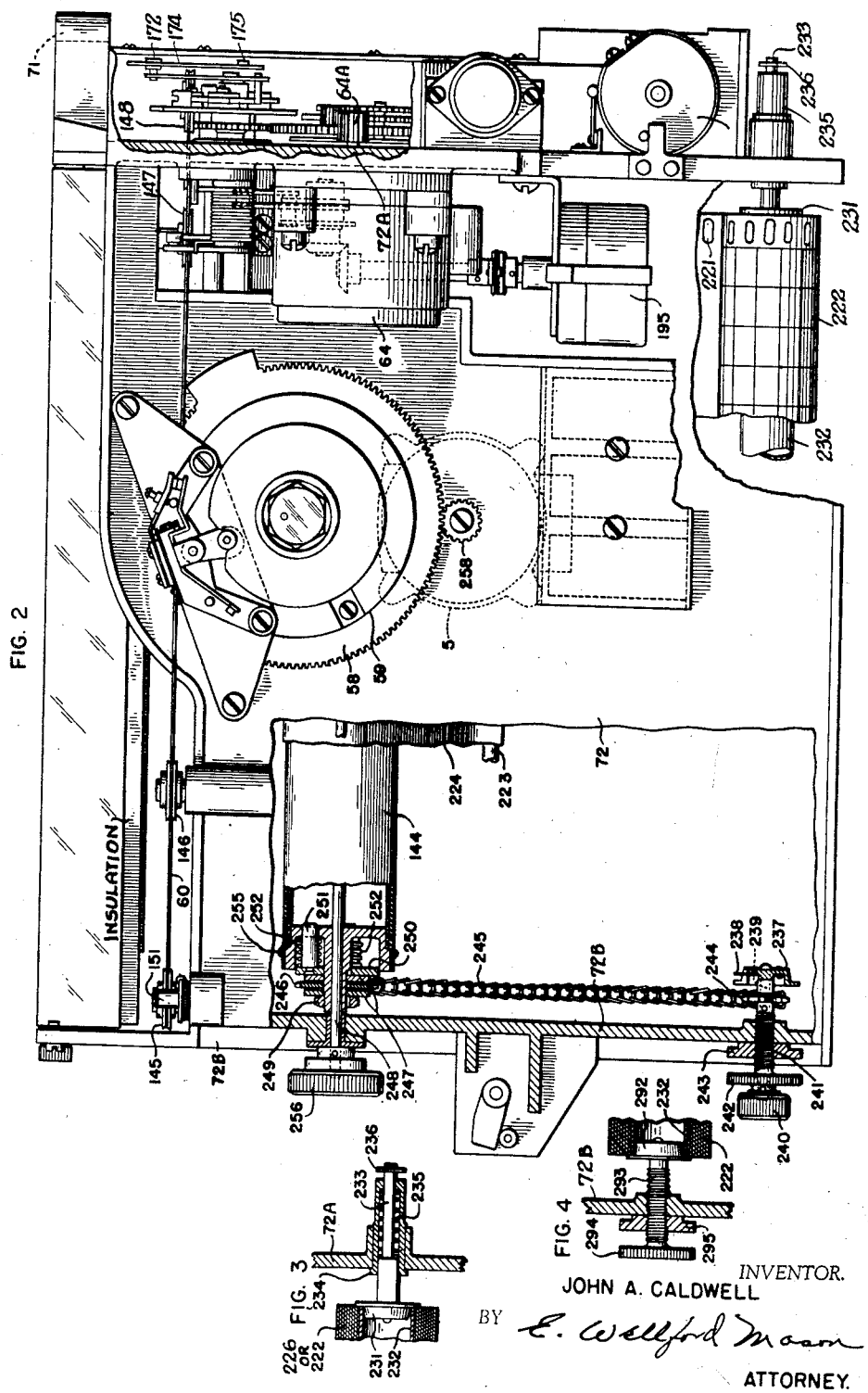
INVENTOR.
JOHN A. CALDWELL
BY E. Wellford Mason
ATTORNEY.

Nov. 18, 1952      J. A. CALDWELL      2,618,528
CHART DRIVE MECHANISM

Original Filed June 20, 1942      3 Sheets-Sheet 3

INVENTOR.
JOHN A. CALDWELL
BY E. Wallford Mason
ATTORNEY

Patented Nov. 18, 1952

2,618,528

UNITED STATES PATENT OFFICE 2,618,528

CHART DRIVE MECHANISM

John A. Caldwell, Philadelphia, Pa., assignor, by mesne assignments, to Minneapolis-Honeywell Regulator Company, Minneapolis, Minn., a corporation of Delaware Original application June 20, 1942, Serial No. 447,863. Divided and this application October 24, 1946, Serial No. 705,303

6 Claims. (Cl. 346—136)

The present invention is a division of my copending application, Serial Number 447,863, filed on June 20, 1942, now Patent No. 2,423,480, patented July 8, 1947. That application is directed generally to a multiple self-balancing potentiometer of the strip chart type, while the present application is specifically related to the chart supply and reroll mechanism that is used in the potentiometer.

In recording potentiometers there is provided a recording mechanism that is moved through a path to various positions corresponding to the value of the condition under measurement. This recording mechanism may either include a pen that is dragged across a chart or, as in the present case, include a print wheel that is adapted to print sequentially the value of a plurality of variables. In either event there is supplied a chart that is moved at a constant rate of speed past the recording station. This chart is generally supplied in a roll that is mounted in the machine. During the time that the instrument is in operation chart is drawn from the supply roll, passed through a recording location and rerolled upon a take-up roll.

In the operation of the chart drive mechcanism it is highly desirable that a simple and reliable means be provided to hold the supply and take-up rolls. Such a means must be readily adjusted to shift the rolls and the chart extending between them axially so that the chart will be correctly positioned with respect to the path of travel of the recording element. It is also desirable to be able to insert and remove the chart rolls with a minimum of time and trouble.

It is therefore an object of the invention to provide a recording instrument in which the chart is easily accessible for inspection and may be readily and quickly changed when a new chart is needed. The chart supply and rewind mechanism is also supplied with novel adjusting means to compensate for irregularly wound rolls of chart paper.

It is a further object of the invention to supply novel and improved chucks for supporting and driving the supply and take-up rolls of the chart.

It is also an object of the invention to provide an improved chart backing plate which may easily be moved from its operative position to one in which the supply roll, which normally lies behind it, may be easily replaced.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 5:
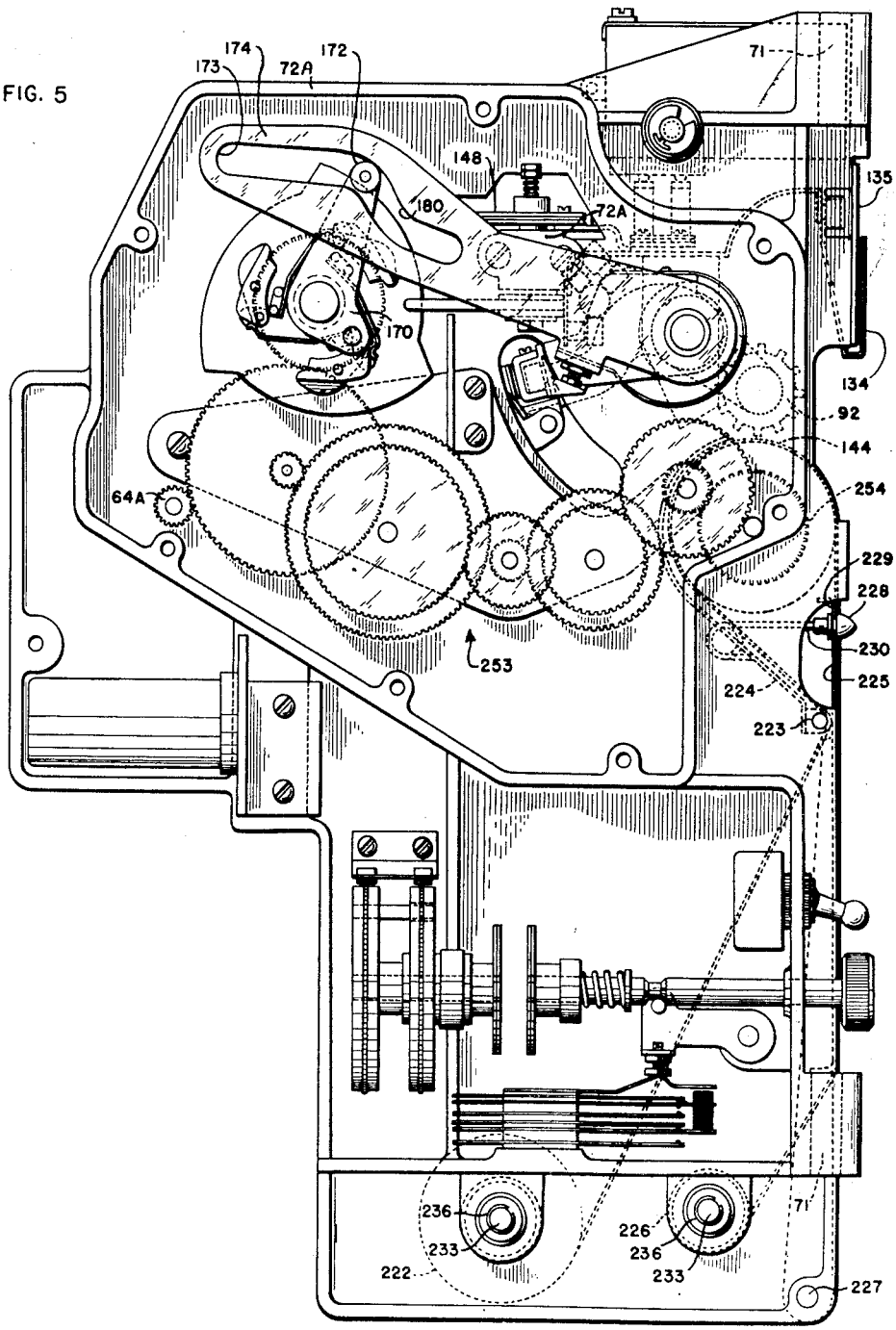

In the drawings:

Figure 1 is a front view of the instrument in its casing with certain portions broken away, Figure 2 is a back view of the supporting frame for the recording instrument with certain portions broken away, Figure 3 is a sectional view showing a chuck for supporting one end of both the chart supply roll and the chart take-up roll, Figure 4 is a sectional view showing a supporting chuck for the other end of the chart supply roll, and Figure 5 is an outside view of the left hand sideplate of the frame of the instrument with associated parts mounted thereon.

The details of construction of the entire potentiometer instrument are shown and described in the above mentioned parent application. The description in this application will be restricted to those parts which are necessary for a complete disclosure of the invention claimed herein. Reference is made to the parent application for further details of apparatus which is shown but not described in this case.

As is known, self-balancing potentiometer instruments are provided with an electrical network that is normally balanced. When, however, the temperature under measurement changes, the E. M. F. produced by a thermocouple, which in this case is the responsive element, varies so that the potentiometer circuit is unbalanced, this acts through suitable electrical apparatus forming a part of the instrument to energize a reversible motor 5 for rotation in one direction or an opposite direction until the instrument is again balanced. Rotation of the motor 5 is imparted to a recording mechanism to move this recording mechanism to a position that is proportional to the value of the temperature or other condition which is under measurement.

The entire potentiometer mechanism is housed within a casing 66 that is provided with a door 67 which is hinged on one side at 68 and which may be opened to give access to the interior thereof. This door is provided with a suitable window 70 through which the recording mechanism and a portion of the chart that has a record upon it may be seen. Mounted in the casing is a chassis or frame 72 upon which various of the parts, including the recording mechanism, are mounted. This chassis is hinged in the casing at 71 and may be swung out of the casing in order to give access to the parts on the rear thereof which are shown on Figure 2. It will be seen that the instrument is provided with a chart 219 upon which a record is made by a print wheel 92. Moving with the print wheel is a pointer 134 that cooperates with a scale 135 which extends across the instrument. Thus, at any time an attendant may have an indication on a large legible scale of the value of the temperature and simultaneously will receive a record of the value of the temperatures which may be saved for future use.

Motor 5 which is shown in dotted outline in Figure 2 is energized for rotation in one direction or another in response to potentiometer unbalance. This motor has on its shaft a pinion 258 which meshes with gear 58 to rotate the latter as the motor rotates. Fastened to the gear is a pulley 59 around which a cable 60 passes. As the pulley is rotated, the cable which extends across the back of the instrument around pulleys 145, 146, 147, 148, continues in a loop across the front of the instrument where it is attached to a carriage upon which print wheel 92 is mounted. Therefore as the motor is energized the print wheel will be moved back and forth across the chart to positions proportional to the temperature under measurement. From time to time when the motor has stopped rotating thus indicating that the instrument is in balance the print wheel is moved into recording engagement with the chart in order to make a record of the temperature. Immediately thereafter the instrument is connected to another thermocouple so that the record of another temperature may be made on the same chart. Mechanism is provided to detect balance of the potentiometer network and operate the printing mechanism. The details of this construction are not pertinent to the present disclosure. It may be stated however that upon balance of the potentiometer network a crank 170 shown in Figure 5 is rotated through a complete revolution. As this crank is rotated a roller 172 on its end moves in a cam slot 173 formed in a lever 174 that is pivoted for movement around a shaft 175. Crank 170 moves in a clockwise direction and as it moves past point 180 in the cam slot lever 174 will be moved in a clockwise direction. This lever is mechanically connected with the print wheel so that as it moves print wheel 92 is moved downwardly in Figure 5 into engagement with the chart. Continued rotation of crank 170 will move lever 174 in a counterclockwise direction and then in a clockwise direction to the position shown where it will be ready to make another recording when the instrument again reaches a balanced condition. Movement of the lever 174 in addition to actuating the print wheel for recording purposes also causes the print wheel to rotate in order to bring another printing character thereon into position and simultaneously operates a selector switch 195 shown in Figure 2 to connect another thermocouple to the potentiometer network.

In order that a continuous record may be made, it is necessary that some means be provided to move the chart through the instrument at a constant rate and that some means be provided to adjust the chart with respect to the travel of the print wheel so that the record will be placed properly on the chart. The present invention is directed specifically to the means for supporting and driving the recording chart. The chart 219 which has been mentioned above, is shown best in Figure 1. It will be seen that the chart is provided with horizontal and vertical lines, and has on one edge a series of round holes 220, and on its opposite edge a series of slots 221. The horizontal lines on the chart serve the purpose of indicating the time at which some particular record is made, while the vertical lines or calibration marks serve to indicate the value of the temperature that has been recorded. As best seen in Figure 5, supply roll 222 of the chart is mounted between the ends of the frame 72 near the bottom, and toward the rear of the frame. The chart, when being inserted into the instrument is pulled upwardly, and forwardly over the rod 223. The chart is then threaded toward the rear of the instrument between a guide member 224, and the chart drum 144. This guide member serves to direct the chart around the drum, from which it is brought down across the front of the instrument, and over a chart backing plate 225 to a chart take up roll 226, which is located at the bottom of the frame directly in front of the supply roll.

The backing plate 225 is preferably hinged at its lower end, as shown at 227, so that it may be moved out of the way when a new chart is to be inserted into the instrument. The backing plate is held in place by means of a pair of lock members 228 that engage cut-out portions 229 on the upper corners of the backing plate.

These locking members are held in engagement with the portions 229 of the backing plate by means of spring members 230 upon which they are mounted.

The supply roll 222 and the take-up roll 226 are mounted at their left ends in Figure 1, or their right ends in Figure 2, in the frame portion 72A upon a spring mounted chuck 231 shown in Figure 3 which is adapted to be wedged into the end of the core 232 of a supply or take-up roll. This chuck is attached to a shaft 233 that is mounted for rotation in a bushing 234 inserted in the frame 72A. The chuck is forced to the left in Figure 3 into engagement with the end of the roll by means of a spring 235, and is limited in its movement by a washer 236 on the outer end of the shaft. It will be noted that the shaft 233 is made of a large diameter near the chuck and a small diameter to the right thereof. This construction gives a large and rigid bearing surface near the end of the chart roll and permits the use of a bushing 234 of the type shown which fully encloses the spring 235.

The left end of the supply roll 222 in Figure 2 or the end in frame portion 72B is mounted on a non-rotatable chuck 292 shown in Figure 4, that is attached to a shaft 293 which is threaded through the frame 72B. This shaft may be provided with a knob 294 to rotate it and shift the chuck axially. In any event a lock nut 295 is threaded over the shaft and is jammed against the frame to hold the chuck firmly in position when it has been adjusted. Since the chuck 292 is non-rotatable it serves to put a drag on the supply roll to prevent the same from overrunning. Both the chuck which supports the left end of the supply roll and that which supports the left end of the take-up roll, to be described below, are axially adjustable so that the rolls may be shifted to the proper position relative to the chart drum 144. The right end of the take-up roll 226 adjacent frame portion 72B is supported by an adjustable and rotatable chuck 237 shown in detail in Figure 2. The chuck is provided with a tongue 238 that is adapted to engage the usual driving notch formed in the end of the roll core (see Figure 1). This tongue extends through an opening in the edge of the chuck and is formed of spring material which always acts to move out into the position shown. When inserting a roll over a chuck of this type, the tongue 238 will be moved against the flange of the chuck. Thereafter, as the roll or the chuck is rotated, the tongue will spring into its driving position as soon as the driving notch of the core is in alignment therewith. The chuck 237 is attached to a shaft 239 whose outer end is provided with a knob 240 whereby the chuck can be rotated at will to supply or take up slack in the chart. The shaft 239 is journaled in a sleeve 241 that is threaded through an opening in the frame 72. The outer end of this sleeve is provided with a thumb nut 242 whereby the sleeve can be rotated in order to shift the chuck to its proper axial position and is provided with a lock nut 243 that can be jammed against the side of the frame to hold the bearing in place.

The chuck used for the take-up roll has attached to the shaft 239 a sprocket 244. This sprocket is driven by a chain 245 that extends over a second and larger sprocket 246. An idler sprocket may be used against the chain to take up slack if this is deemed necessary. In order to compensate for increasing diameter of the chart on the take-up drum the sprocket 246 is frictionally driven by the chart drum 144 by means of a pair of friction washers 247 that are keyed to a shaft 248 on the end of the chart drum. The sprocket and the friction washers are moved together and against a nut 249 that is screwed on the shaft by means of a plate 250 which is forced to the left by springs 252. Each of the springs 252 surround a plunger 251 which is attached to the plate 250 and which is freely movable through openings that are formed in the end of the chart drum. In order to adjust the tension of the springs, and therefore the friction with which the sprocket 246 is driven, the nut 249 may be moved to the left or right along the shaft 248.

The chart drum in this embodiment of the invention is driven at a constant speed by the motor 64 through a gear train 253 that starts with the pinion 64A (Figures 2 and 5) and ends with the gear 254 that is frictionally mounted on the drum. It will be seen from Figure 1 that the chart drum is provided on each end with a series of projections 255 that project through the openings 220 and 221 on the chart. By means of these projections and openings the chart is positively moved past the print wheel at some given speed. The speed of the chart drum may of course be changed by substituting a different gear reduction between the motor and the chart drum. The shaft upon which the chart drum is mounted is provided with a knob 256 by means of which the chart drum may be rotated to position properly the chart with respect to the print wheel. There is also provided a member 296 which extends over the edge of the chart and which can be used as a guide to set properly the time lines on the chart relative to the print wheel and a so-called tear-off strip 257 which is made of some transparent material and which extends across the instrument in front of the chart. The purpose of this member is to act as a straight edge when a piece of the chart is to be removed.

From time to time it becomes necessary to replace the chart roll in the instrument. When this is done the empty core 232 which will be on the supply roll chucks is removed from those chucks and placed on the take-up roll chucks 231 and 237 which are shown in the lower right hand corner of Figure 5. Locking members 228 are then moved upwardly out of notches 229 on the chart backing plate 225. This plate may then be moved forwardly around its pivots 227 until it is completely out of the way. The new chart roll is then placed on the chucks 231 and 292. The leading end of the chart is then removed from the chuck and pulled forwardly around rod 223, threaded between guide 224 and chart drum 144 and enough of this chart is pulled off of the supply roll to extend down the front of the instrument and be wrapped around the take-up roll core. The chart backing plate is then moved back into position and the end of the chart is brought down in front of this plate and suitably attached to the core of the take-up roll. Thereafter the chart drive mechanism, which is run by motor 64, will forward the chart and rewind it in a manner above described.

When charts of this type are printed great pains are taken to make sure that the calibration marks always come the same distance from the right edge of the chart in Figure 1 so that when the perforations on the chart are placed over the projections 255, the chart will be properly aligned in the instrument. It is therefore necessary that the chucks for the right hand end in Figure 1 of the supply and take-up rolls be adjusted axially so that the chart will be pulled straight through the machine. If the chucks are not properly adjusted there will be a tendency to tear the chart. Normally speaking the chucks will only have to be adjusted when the first roll is put into the instrument because of the care with which the chart is printed and wound. It may be, however, that a roll of chart has been dropped and slightly telescoped. In such a case minor adjustment of the supporting chucks will be necessary. Since the chucks which support the left hand end of the rolls in Figure 1 are spring pressed toward the right, these chucks will automatically assume the proper positions.

From the above description it will be seen that I have provided a simple and reliable means for mounting and driving a chart in a recording instrument. By means of the construction shown the chart is driven at a constant rate of speed through the instrument and in a path which can be adjusted for different charts but which always insures that the chart will be properly lined up with respect to the travel of the recording element.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a measuring and recording instrument, a frame including a pair of parallel sides, a chart drum mounted for rotation in said sides, supply and take-up holding means for a roll of chart paper mounted in said sides below and slightly behind said chart drum, a chart backing plate mounted between said sides below said chart drum and in front of said holding means, means to pivot said backing plate to said sides independent of said holding means whereby said backing plate can be swung forwardly to give access to said holding means, and means to releasably maintain said backing plate in position below said chart drum.

2. In a recording instrument, a frame having a pair of parallel sides, a chart drum mounted for rotation in said sides, supply and take-up holding means for a roll of chart paper mounted below and slightly to the rear of said chart drum, the chart passing upwardly and forwardly over said chart drum and downwardly to said take-up holding means, guide means to direct the chart around said chart roll, chart backing means located below said chart drum and in front of said mounting means over which the chart passes on its way from the chart drum to the take-up holding means, means to pivotally mount said backing means at its lower end on said sides independent of said holding means whereby the backing means may be swung forwardly to give access to said mounting means, and resilient holding means to maintain said backing means in place.

3. In a recording instrument, the combination of a rectangular casing having an open front, a door to close said front hinged to one side of said casing, a frame member hinged to the opposite side of said casing near the front, recording means carried by said frame, a rotatable chart drum mounted below said recording means and adapted to support a chart in a position to be recorded upon by said recording means, means located on said frame below and to the rear of said chart drum to support a supply roll of paper comprising a spring pressed plunger adapted to engage one end of said roll and a chuck to engage the other end of said roll, means to mount said chuck for axial movement and means to lock said chuck against rotation and axial movement, means to guide paper from the supply roll to said chart drum, means to take-up paper on a roll from said chart drum located on said frame below said chart drum and adjacent the supply roll comprising a second chuck having a surface upon which one end of the take-up roll is to be mounted by engagement therewith and a flange adapted to engage the end of the roll, a driving member extending through said surface and resiliently moved to a position remote from said flange, supporting means to rotatably mount said second chuck, means to shift said supporting means axially, means to lock said supporting means in position, means to rotate said second chuck, a chart backing plate located below said chart drum and above and in front of said take-up roll support, means to pivot said backing means to said frame whereby it may be moved to give access to the supply and take-up rolls, and means to lock resiliently said backing plate in operative position.

4. In an instrument for making a record on a strip chart, a support, supporting means on which a roll of said strip chart is mounted on said support, a part to back up said strip chart after a record has been made thereon, pivots mounting said part at its lower end to said support for turning movement about an axis transverse to the path of movement of said strip chart and separate from the supporting means for mounting said strip chart on said support so that said supporting means are not disturbed, and means to hold said part in normal position beneath said strip chart.

5. In an instrument for making a record on a strip chart, recording means movable through a path, a chart drum extending along said path adjacent said recording means, supply and take-up means located below said drum and adapted to mount a roll of the strip chart thereon, a support on which said recording means and said drum and said supply and take-up means are mounted, a part to back up said strip chart after a record has been made thereon and located below said drum approximately tangent thereto, said part extending the length of said drum, means to pivot said part at its lower end to said support for turning movement about an axis parallel to said path, while said supply and take-up means remain stationary, and means to hold said part in position beneath said drum.

6. In an instrument for making a record on a strip chart, a frame having forwardly projecting sides, means for supporting a roll of the strip chart on said sides, a backing plate adapted to underlie said chart when the chart is in operative position, said backing plate being hinged to said sides for movement about its hinges independently of said means for supporting said roll of the strip chart so as to afford access to said means which means remain stationary in their normal position; said backing plate having cut-out portions, lock members having substantially conical front faces and substantially flat rear faces, and spring members mounting said lock members so that said lock members are moved aside slightly by the edges of said cut-out portions as said backing plate is turned toward its normal portion underlying said chart, and said lock members then latch over the edges of said cut-out portions so that the flat rear faces of the lock members engage and hold the edges of said backing plate while said backing plate is in its normal position.

JOHN A. CALDWELL.

REFERENCES CITED

The following references are of record in the file of this patent:

UNITED STATES PATENTS

| Number | Name | Date |
|---|---|---|
| 1,604,732 | Au | Oct. 26, 1926 |
| 1,847,918 | Blanchard | Mar. 1, 1932 |
| 1,871,230 | Foster | Aug. 9, 1932 |
| 1,880,008 | Angus | Sept. 27, 1932 |
| 2,074,118 | Ross et al. | Mar. 16, 1937 |
| 2,412,639 | Traugott | Dec. 17, 1946 |
| 2,483,729 | Greenleaf | Oct. 4, 1949 |